Figure 1:
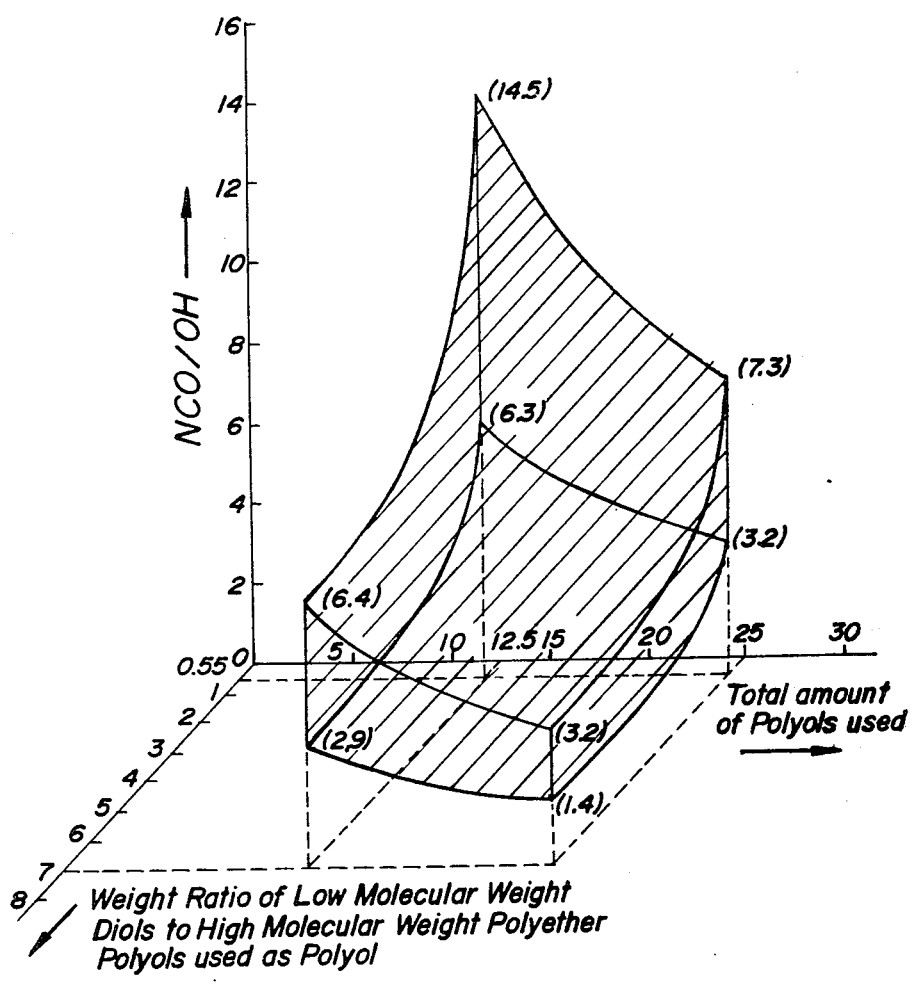

United States Patent [19]

Ohashi et al.

[11] 4,256,846
[45] Mar. 17, 1981

[54] METHOD OF PRODUCING FLAMEPROOF POLYISOCYANURATE FOAMS

[75] Inventors: Takashi Ohashi, Iruma; Toru Okuyama, Sagamihara; Hiroshi Kaneda; Yoshiko Taniguchi, both of Higashimurayama; Masako Yoshida, Kodaira, all of Japan

[73] Assignee: Bridgestone Tire Co., Ltd., Tokyo, Japan

[21] Appl. No.: 59,430

[22] Filed: Jul. 20, 1979

[30] Foreign Application Priority Data

Nov. 10, 1978 [JP] Japan .................. 53/137785

[51] Int. Cl.³ .............. C08G 18/14; C08G 18/20; C08G 18/65
[52] U.S. Cl. ...................... 521/117; 521/131; 521/125; 521/176; 521/902
[58] Field of Search .............. 521/117, 125, 176, 131, 521/902

[56] References Cited

U.S. PATENT DOCUMENTS

| | | | |
|---|---|---|---|
| 3,630,973 | 12/1971 | Ardis et al. | 521/176 |
| 3,993,576 | 11/1976 | Barron | 521/176 |
| 4,129,697 | 12/1978 | Schäpel et al. | 521/176 |
| 4,169,921 | 10/1979 | Moss et al. | 521/902 |

Primary Examiner—H. S. Cockeram
Attorney, Agent, or Firm—Sughrue, Rothwell, Mion, Zinn and Macpeak

[57] ABSTRACT

A method of producing flameproof polyisocyanurate foams is disclosed. When the foam is produced by reacting an organic polyisocyanate with polyols as a modifying agent in the presence of an isocyanate trimerization catalyst, a blowing agent and other additives, a combination of particular low molecular weight diols with particular high molecular weight polyether polyols is used as the polyol in a special weight ratio and a special total amount per 100 parts by weight of the organic polyisocyanate in the presence of special combination of an alkali metal salt of a carboxylic acid and a tertiary amine compound as the catalyst.

12 Claims, 2 Drawing Figures

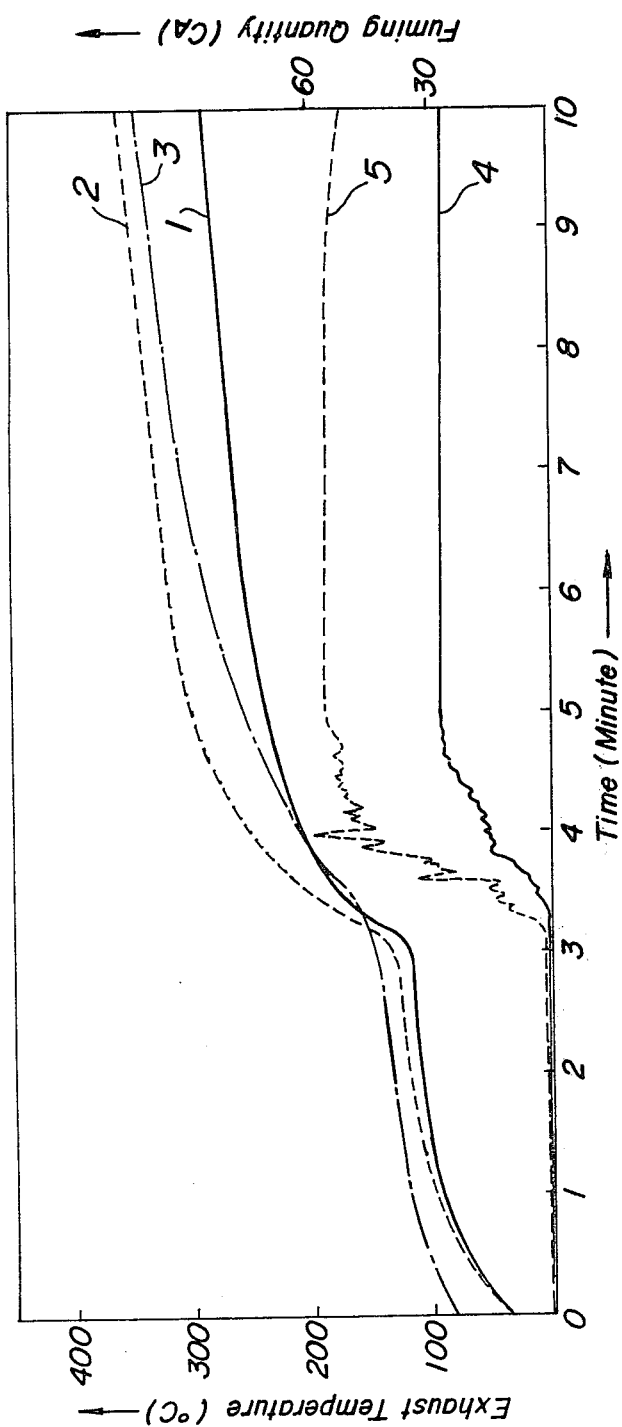

METHOD OF PRODUCING FLAMEPROOF POLYISOCYANURATE FOAMS

This invention relates to a method of producing flameproof polyisocyanurate foams. More particularly, it relates to a method of producing urethane modified polyisocyanurate foams, which have an excellent fireproof property passed Grade 2 incombustibility (quasi-incombustible material) according to Japanese Industrial Standard (JIS) A-1321 combustion test for incombustibility of internal finish material of buildings, by using a combination of particular polyols as a modifying agent and using a particular isocyanate trimerization catalyst.

As is well-known, polyisocyanurate foams are produced by reacting and foaming organic polyisocyanate in the presence of an isocyanate trimerization catalyst, a blowing agent and, if necessary, a surfactant. Such foams have a thermal insulating property substantially equal to that of polyurethane foams and very excellent thermal resistance and fireproof property, but they are very friable and are apt to be burst into fragments like popcorn under an exposure to a flame, so that they are not yet been put to practical use.

Now, productions of various modified isocyanurate foams have hitherto been proposed in order to improve the above drawbacks of the polyisocyanurate foam. For instance, there have been produced urethane modified isocyanurate foams using a polyol as a modifying agent, oxazolidone modified isocyanurate foams using an epoxy compound as a modifying agent, carbodiimide modified isocyanurate foams containing carbodiimide bonds, and the like. In these modified isocyanurate foams, however, it has been confirmed that the fireproof property lowers to a significant degree though it is attained to solve the drawbacks of the polyisocyanurate foam.

That is, when these modified isocyanurate foams are evaluated by a fireproof test under very severe conditions such as JIS A-1321 combustion test for the fireproof property of Grade 2 incombustibility (quasi-incombustible material), they do not pass acceptable standard values of heat release value, fuming factor, crack and the like. As a result, it is a common sense in the art that it is impossible to provide materials passing Grade 2 incombustibility up to now.

The inventors have made various studies with respect to the modification of the isocyanurate foam and as a result, there has already been proposed a method of producing modified isocyanurate foams capable of passing Grade 2 incombustibility wherein an organic silicone surfactant, which is an essential ingredient in the production of polyisocyanurate foams, is not used at all or may be added in an amount of not more than 0.2% by weight based on the organic polyisocyanate (U.S. Patent Application Ser. No. 917,238).

The thus obtained foams certainly have a fireproof property of Grade 2 incombustibility. However, the rate of closed cells in the foam is fairly decreased due to the absence or slight presence of the surfactant and hence the thermal conductivity becomes larger. Consequently, the thermal insulating property of the foam lowers considerably.

With the foregoing in mind, the inventors have further made various studies with respect to the improvement of the above mentioned method and found out a method of producing flameproof modified isocyanurate foams which have thermal insulating property and other physical properties substantially equal to those of the polyurethane foam and a fireproof property passed Grade 2 incombustibility according to JIS A-1321 combustion test, and as a result, the invention has been accomplished.

According to the invention, there is provided a method of producing flameproof polyisocyanurate foams by reacting an organic polyisocyanate with a polyol in the presence of an isocyanate trimerization catalyst, a blowing agent and other additives to form an urethane modified polyisocyanurate foam, which comprises:

(1) using, as said polyol, at least one low molecular weight diol (hereinafter referred to as A-group diol) selected from the group consisting of (a) compounds having the general formula

wherein n is 2, 3 or 4, (b) compounds having the general formula

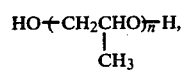

wherein n is 2 or 3, (c) 2,3,-butane diol and (d) 2-butene-1,4-diol together with at least one high molecular weight polyether polyol (hereinafter referred to as B-group polyetherpolyol) having 2 to 4 hydroxyl groups in its molecule and a hydroxyl equivalent of 600 to 2,000, (2) being a weight ratio of the sum of A-group diols to the sum of B-group polyetherpolyols within a range of 0.55 to 7.0, (3) being a total amount of A-group diols and B-group polyetherpolyols used as said polyol within a range of 12.5 to 25 parts by weight per 100 parts by weight of said organic polyisocyanate, and (4) using, as said isocyanate trimerization catalyst, a combination of an alkali metal salt of a carboxylic acid having a carbon number of 2 to 12 with a tertiary amino compound in case of using A-(a)-group diol, or a combination of an alkali metal salt of a carboxylic acid having a carbon number of 2 to 12 with a dialkylaminoalkyl phenol in case of using A-(b), (c) or (d)-diol alone.

According to the invention, urethane modified polyisocyanurate foams satisfying all of the above mentioned properties are first obtained only by using particular diols selected from the well-known low molecular weight diols together with specified high molecular weight polyether polyols in certain limited weight ratio and total amount to be reacted with the organic polyisocyanate in the presence of a particular combination of isocyanate trimerization catalysts. This fact is an unexpected result which has never been anticipated from the prior art.

The invention develops unique effects by special combination of well-known polyols and catalyst as mentioned above and is entirely different from the prior arts partly similar to the invention as mentioned below.

For instance, there is disclosed in Japanese Patent Laid-Open No. 101,497/73 that more than 85% of the polyisocyanate is trimerized by using a low molecular weight diol having a molecular weight of about 50 to 200 together with a polyol having a molecular weight of more than 200 in the production of the urethane modified isocyanurate foam. Especially, the low molecular weight diol includes a part of diols defined in the invention. In this article, however, only the molecular weight is defined with respect to the low molecular weight diol and high molecular weight polyol and particularly, the practically used polyol is a polyol having a hydroxyl equivalent of not more than 200, which is fairly smaller than that defined in the invention, and further there is no limitation relating to the catalyst used. Moreover, it has been confirmed that the urethane modified isocyanurate foam obtained by the method of this article does not pass Grade 2 incombustibility according to JIS A-1321 combustion test owing to large heat release value and fuming factor but has a fireproof property passing only about Grade 3 incombustibility.

On the contrary, the inventors have made various investigations with respect to the polyols and catalyst and found out that in order to obtain urethane modified polyisocyanurate foams capable of passing Grade 2 incombustibility, the kinds of low molecular weight diols, relatively high molecular weight polyether polyols and catalysts, weight ratio of diols to polyether polyols, total amount of diols and polyether polyols per organic polyisocyanate, and the combination of catalysts should be defined as mentioned above. Accordingly, it is apparent that the invention cannot be anticipated from Japanese Patent Laid-Open No. 101,497/73 at all.

In Japanese Patent Laid-Open No. 81,996/73, there is proposed a miscible liquid solution for the production of urethane modified isocyanurate foams, comprising a part of low molecular weight diols as defined in the invention, other polyols and potassium acetate among metal salts of carboxylic acids as an isocyanate trimerization catalyst. However, this article is to improve the miscibility of the ingredients in the solution and is entirely different from the invention like the case of Japanese Patent Laid-Open No. 101,497/73. Moreover, when potassium acetate is used alone as the isocyanate trimerization catalyst, the foams passing Grade 2 incombustibility cannot be obtained according to the method of the invention as mentioned below.

In Japanese Patent Application Publication No. 21,440/78, there is disclosed a method of producing a rigid polymer article wherein a mixture of (i) about 5 to 60% by weight of a polyol having 2 to 8 functional group and an equivalent of about 30 to 200 and (ii) about 40 to 95% by weight of a polyether polyol selected from (a) a polyether diol having an equivalent of about 750 to 2,100, (b) a polyether triol having an equivalent of about 750 to 1,500 and (c) a polyether triol having an equivalent of about 1,500 to 2,100 wherein at least 50% of hydroxyl group in the polyether polyol (c) is a primary hydroxyl group is used as a polyol and then reacted and foamed with a polyisocyanate in an amount of about 0.1 to 0.5 equivalent per 1 equivalent of the polyisocyanate in the presence of an isocyanate trimerization catalyst and a blowing agent. However, this publication is to improve the shock resistance of the article obtained under given conditions, i.e. under integrated skin forming conditions in a closed mold and is entirely different from the invention in the object. Further, the low molecular weight polyol ingredient used in this publication is entirely different from the low molecular weight diol defined in the invention and there is no description relating to the amounts of polyol ingredients used and kind and combination of catalyst as mentioned above. In addition, it has been confirmed that when the tertiary amino compound such as N,N',N''-tris(dimethylaminopropyl)sym-hexahydrotriazine, which is described in this publication, is used alone as the isocyanate trimerization catalyst, foams capable of passing Grade 2 incombustibility cannot be obtained even by using any combination of polyols as mentioned below.

In British Pat. No. 1,318,925, there is disclosed a method of producing an urethane modified isocyanurate foam by using a polyester polyol as a modifying agent and a combination of a hydroxide and/or salt of an alkali metal and/or alkaline earth metal dissolved in an organic solvent having a polar hydroxyl group and 2,4,6-tris(N,N-dimethylaminomethyl)-phenol of a tertiary amino compound as an isocyanate trimerization catalyst. However, this patent is to improve the reactivity and cell properties when the modifying agent is restricted to the polyester polyol though the catalyst system is partly included in the catalyst combination defined in the invention, so that this patent is entirely different from the invention in the technical idea.

As mentioned above, it is apparent that the invention is entirely different from the prior arts and cannot easily be conceived from any combination of the prior arts.

The invention will now be described in greater detail with reference to the accompanying drawings, wherein:

FIG. 1 is a graph showing a range of developing high fireproof property (shadowed region) according to the invention in the three-dimensional system wherein y axis represents a weight ratio of the sum of low molecular weight diols to the sum of high molecular weight polyether polyols, x axis represents a total amount (part by weight) of polyols used per 100 parts by weight of the organic polyisocyanate, and z axis represents an equivalent ratio (NCO/OH) of the organic polyisocyanate to the total of polyols calculated from the ratio of the sum of the low molecular weight diols to the sum of the high molecular weight polyether polyols and the total amount of polyols used per 100 parts by weight of the organic polyisocyanate; and FIG. 2 is a graph showing exhaust temperature curve and fuming curve of urethane modified polyisocyanurate foams of the invention and prior art according to JIS A-1321 surface combustion test.

In the production of urethane modified polyisocyanurate foams according to the invention, it is necessary that the polyol to be added as a modifying agent is a combination of A-group diol and B-group polyetherpolyol as defined above. That is, the A-group diol is at least one low molecular weight diol selected from the group consisting of (a) diethylene glycol, triethylene glycol and tetraethylene glycol of the general formula

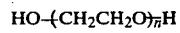

wherein n is 2, 3 or 4, (b) dipropylene glycol and tripropylene glycol of the general formula

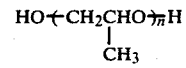

wherein n is 2 or 3, (c) 2,3-butane diol and (d) 2-butene-1,4-diol. When using the low molecular weight diol other than the above defined diols, there cannot be obtained urethane modified polyisocyanurate foams capable of passing Grade 2 incombustibility.

The B-group polyetherpolyol to be used together with the A-group diol is at least one polyether polyol having 2 to 4 hydroxyl groups in its molecule and a hydroxyl equivalent of 600 to 2,000. When using the polyether polyol other than the above defined polyetherpolyols, there cannot also be obtained foams capable of passing Grade 2 incombustibility. As the B-group polyetherpolyol, mention may be made of polyoxyalkylene glycols obtained by reacting ethylene oxide, propylene oxide, butylene oxide or a mixture thereof with a diol such as ethylene glycol, 1,2-propylene glycol, 1,3-propane diol, 1,4-butane diol, 2,3-butane diol, 1,5-pentane diol, 1,2-hexane diol, diethylene glycol and dipropylene glycol; polyoxyalkylene triols or polyoxyalkylene tetraols obtained by reacting ethylene oxide, propylene oxide, butylene oxide or a mixture thereof with a triol or tetraol such as glycerin, trimethylol propane, 1,2,6-hexane triol and pentaerythritol; polytetramethylene glycol and the like.

According to the invention, the weight ratio of low molecular weight diol to high molecular weight polyether polyol should be within a range of $$\frac{\text{sum of } A\text{-group diols used}}{\text{sum of } B\text{-group polyetherpolyols used}} = 0.55 \sim 7.0$$

and the total amount of A-group diols and B-group polyetherpolyols used should be within a range of 12.5 to 25 parts by weight per 100 parts by weight of the organic polyisocyanate. When the weight ratio and total amount are beyond the above defined ranges, the resulting urethane modified polyisocyanurate foams do not pass Grade 2 incombustibility due to the degradation of the fireproof property. Moreover, the preferred weight ratio of the sum of A-group diols to the sum of B-group polyetherpolyols is within a range of 1.0 to 5.0 and the preferred total amount of A-group diols and B-group polyetherpolyols used as the polyol is within a range of 14 to 22 parts by weight per 100 parts by weight of the organic polyisocyanate. In such preferred ranges, it makes possible to produce urethane modified polyisocyanurate foams having more improved fireproof property.

In FIG. 1, the requirements for achievement of the invention are schematized by a three-dimensional system wherein the weight ratio of the sum (part by weight) of the A-group diols to the sum (part by weight) of the B-group polyetherpolyols is plotted on y axis, the total amount (part by weight) of the A-group diols and B-group polyetherpolyols used as the polyol per 100 parts by weight of the organic polyisocyanate is plotted on x axis and the equivalent ratio (NCO/OH) of the organic polyisocyanate to the total polyols calculated from the weight ratio of the sum of the A-group diols to the sum of the B-group polyetherpolyols and the total amount of the polyols per 100 parts by weight of the organic polyisocyanate is plotted on z axis. The shadowed region of FIG. 1 is a range of developing the effect of the invention.

The isocyanate trimerization catalyst to be used in the invention is alkali metal salts of carboxylic acids having a carbon number of 2 to 12 and tertiary amino compounds. The former includes potassium acetate, potassium propionate, potassium 2-ethylhexanoate, potassium caprylate and the like or a mixture thereof. The latter includes dialkylaminoalkyl phenols such as 2,4,6-tris(dimethylaminomethyl) phenol, a mixture of 2,4- and 2,6-bis(dimethylaminomethyl) phenols and the like; triethylamine; triazine cyclic derivatives such as N,N',N''-tris(dimethylaminopropyl)-sym-hexahydrotriazine and the like; tetraalkylalkylene diamines; dimethylethanol amine; triethylenediamine and its lower alkyl substituted derivatives; and mixtures thereof.

According to the invention, it is necessary to use the alkali metal salt of carboxylic acid having a carbon number of 2 to 12 together with the tertiary amino compound as the isocyanate trimerization catalyst when the A-(a)-group diol of the general formula

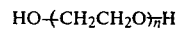
HO—(CH$_2$CH$_2$O)$_{\overline{n}}$H wherein n is 2, 3 or 4 is used as the low molecular weight diol. When the alkali metal salt of carboxylic acid or the tertiary amino compound is used alone, there cannot be obtained urethane modified polyisocyanurate foams having a favorable fireproof property. Moreover, the flameproof foams cannot similarly be obtained even when using an isocyanate trimerization catalyst other than the above defined catalysts.

When the A-(b), (c) and (d)-diols, i.e. (b) dipropylene glycol and tripropylene glycol of the general formula

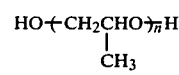
HO—(CH$_2$CHO)$_{\overline{n}}$H
          |
          CH$_3$ wherein n is 2 or 3, (c) 2,3-butane diol and (d) 2-butene-1,4-diol are only used alone or in admixture thereof together with the B-group polyetherpolyols as the polyols, the foams having an improved fireproof property are obtained only by using as the isocyanate trimerization catalyst the alkali metal salt of carboxylic acid having a carbon number of 2 to 12 together with a dialkylaminoalkyl phenol as the tertiary amino compound. In other words, when using the tertiary amino compound other than the dialkylaminoalkyl phenols, it makes impossible to produce foams having the desired fireproof property.

The amount of the isocyanate trimerization catalyst added varies depending upon the kind of the modifying agent, but it is usually about 0.5 to 8 parts by weight per 100 parts by weight of the organic polyisocyanate.

In the production of the urethane modified polyisocyanurate foams according to the invention, any of organic polyisocyanates used in the prior art may be used. The organic polyisocyanate means an organic compound having two or more isocyanate groups in its molecule and includes aliphatic polyisocyanates, aromatic polyisocyanates, mixtures and modified substances thereof. As the aliphatic polyisocyanate, mention may be made of hexamethylene diisocyanate, isophorone diisocyanate, dicyclohexylmethane diisocyanate, methylcyclohexane diisocyanate and the like. As the aromatic polyisocyanate, mention may be made of tolylene diisocyanate (2,4- and/or 2,6-isomers), diphenylmethane diisocyanate, ditolylene diisocyanate, naphthalene diisocyanate (e.g., 1,5-naphthalene diisocyanate), triphenylmethane triisocyanate, dianisidine diisocyanate, xylylene diisocyanate, tris(isocyanate phenyl) thiophosphate, polynuclear polyisocyanate having the following formula

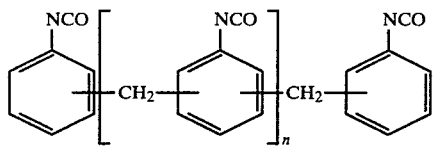

wherein n is 0 or an integer of 1 or more (so-called crude MDI or polymeric isocyanate) obtained by reacting a low polycondensate of aniline and formaldehyde with phosgene, undistilled tolylene diisocyanate and the like. Further, prepolymers having two or more isocyanate groups, which are obtained by any conventional method, for example, prepolymers having an urethane group, a biuret group, an isocyanurate group, a carbodiimide group, an oxazolidone group or the like may be used. These polyisocyanates may be used alone or in admixture of two or more polyisocyanates. As the organic polyisocyanate, the aromatic polyisocyanates, particularly polynuclear aromatic polyisocyanates are preferable in view of flameproofing.

According to the invention, all of blowing agents used in the production of conventional polyurethane foams and polyisocyanurate foams may be used. For instance, the blowing agent includes carbon dioxide gas generated by adding water to the reaction mixture or supplied from an external source, nitrogen gas and a mixture thereof. However, the preferred blowing agent is a low-boiling inert solvent evaporating by a heat of reaction in the foaming process. Such a solvent is a fluorinated and/or chlorinated hydrocarbon having a good compatibility, a typical example of which includes trichloromonofluoromethane, dichlorodifluoromethane, dichloromonofluoromethane, monochlorodifluoromethane, dichlorotetrafluoroethane, 1,1,2-trichloro-1,2,2-trifluoroethane, methylene chloride, trichloroethane and the like. Further, benzene, toluene, pentane, hexane and so on may be used. These blowing agents may be used alone or in an admixture thereof. Among them, trichloromonofluoromethane is preferable as the blowing agent in view of the foam properties, easiness of foaming and the like. The addition amount of the blowing agent is preferably 5 to 50% by weight of the foam forming composition.

In addition to the above mentioned ingredients, a surfactant and other additives may be added, if necessary.

As the surfactant, use may be made of any ones usually used in the production of polyurethane foams and polyisocyanurate foams, an example of which includes an organosilicone surfactant such as organopolysiloxanepolyoxyalkylene copolymer, polyalkenyl siloxane having a side chain of polyoxyalkylene and the like. Further, oxyethylated alkyl phenol, oxyethylated aliphatic alcohol, ethylene-propylene oxide block polymer and so on are effective as the surfactant. The surfactant is usually used in an amount of about 0.01 to 5 parts by weight per 100 parts by weight of the organic polyisocyanate.

As the other additive, there are inorganic hollow particles, granulated refractory, fibrous materials, inorganic fillers and the like, which are used for improving the foam properties such as hardness and the like. The inorganic filler includes mica powder, finely divided clay, asbestos, calcium carbonate, silica gel, aluminum hydroxide, calcium hydroxide, magnesium hydroxide, gypsum, sodium silicate and the like.

Moreover, a flame retardant may be added without deviating the effect of the invention. According to the invention, the flame retardant usually used in the common polyurethane foam and urethane modified isocyanurate foam is effective and includes, for example, halogenated organic phosphorus compounds such as tris(2-chloroethyl)phosphate, tris(2-chloropropyl)phosphate, tris(2,3-dichloropropyl)phosphate and the like; halogen compounds such as chlorinated paraffin and the like; and inorganic flame retardant such as antimony oxide and the like.

The urethane modified polyisocyanurate foams according to the invention are obtained by the foaming reaction of the above mentioned ingredients and have properties and thermal insulating property substantially equal to those of the polyurethane foam and further develop an improved fireproof property passed Grade 2 incombustibility according to JIS A-1321 combustion test. Particularly, the followings are guessed with respect to the improvement of the fireproof property.

Namely, an aspect of the invention lies in that the A-group diols and B-group polyetherpolyols are used together in the defined amount ranges as the modifying agent. Further, the A-group diols are small in the compatibility with the organic polyisocyanate owing to the large polarity, so that phase separation between the resulting urethane bond and isocyanurate bond becomes good and as a result, the formation of isocyanurate bond is hardly hindered in the formation of urethane bond. While, the number of functional group in the B-group polyetherpolyols is low, so that the molecular chain in the formation of urethane bond is long and the cross-linked density is low and as a result, the formation of isocyanurate bond is hardly hindered. Therefore, the total effect of using the A-group diols and B-group polyetherpolyols as the modifying agent appears to perform the smooth formation of isocyanurate bond. Moreover, the combination system of the alkali metal salt of carboxylic acid with the amine catalyst (particularly, the dialkylaminoalkyl phenols have a good compatibility with the organic polyisocyanate and is effective for the formation of isocyanurate bond), which has an excellent activity for the formation of isocyanurate bond, is used as the isocyanate trimerization catalyst, so that the formation of isocyanurate bond, whose quantity and quality are superior to those of the conventional modified isocyanurate foam, can be achieved by the synergistic effect of the above modifying agent and catalyst combination system.

However, when the total amount of the polyols used as the modifying agent is below the lower limit, the quantity of urethane bond formed in the initial reaction stage decreases and the reaction system itself hardly reaches to an activation level required for the formation of isocyanurate bond, so that the formation of isocyanurate bond is suppressed. While, when the total amount exceeds the upper limit, the quantity of urethane bond exhibiting poor thermal resistance increases and the formation of isocyanurate bond is apt to be hindered under influences of diffusion controlled rate and the like accompanied with the increase of urethane bond quantity. Moreover, when the weight ratio of the A-group diols to the B-group polyetherpolyols is outside the defined range, the balance between the urethane forming reaction and the isocyanurate forming reaction becomes unbalanced, so that the formation of isocyanurate bond is not achieved satisfactorily. Therefore, it is guessed that when the total amount and weight ratio are outside the defined ranges, the formation of isocyanurate bond exhibiting an excellent thermal resistance is not sufficiently achieved so that the fireproof property of the resulting foam is degraded.

Since the urethane modified polyisocyanurate foams according to the invention has a sufficient quantity of isocyanurate bond, the formation of char is accelerated on the surface of the foam specimen in JIS A-1321 combustion test and the resulting char acts as a barrier against a fire source to decrease the combustion amount of the specimen as a whole, so that the heat release value, fuming factor and the like lower and as a result, the improved fireproof property capable of passing Grade 2 incombustibility is obtained.

In FIG. 2 are shown an exhaust temperature curve and a fuming curve of urethane modified polyisocyanurate foams of the invention and the prior art according to JIS A-1321 surface combustion test, respectively. The curve 1 represents an exhaust temperature of an urethane modified polyisocyanurate foam obtained in Example 4 as mentioned below, the curve 2 represents an exhaust temperature of an urethane modified polyisocyanurate foam obtained in Comparative Example 4 as mentioned below, the curve 3 represents an exhaust temperature of a standard specimen (asbestos perlite plate defined according to JIS A-5413), and the curves 4 and 5 represent fuming quantities of the urethane modified polyisocyanurate foams of Example 4 and Comparative Example 4, respectively. From FIG. 2, it can be seen that in the urethane modified polyisocyanurate foam according to the invention, the combustion is suppressed by the formation of char barrier against the fire source and also the exhaust temperature and fuming quantity become considerably lower than those of the conventional urethane modified polyisocyanurate foam.

The production of the foams according to the invention may be carried out by any well-known processes, but is usually performed as follows. That is, the polyols as an urethane modifying agent, catalyst and blowing agent are mixed with stirring by adding a foam stabilizer and other additives, if necessary, to form a homogeneous mixed solution. To this solution is added the organic polyisocyanate with stirring, and then the resulting reaction mixture is extruded and foamed in a mold or the like by pouring, spraying and the like.

The urethane modified polyisocyanurate foams according to the invention are usable thermal insulating materials, building materials or the like for housing, building and so on owing to the improved fireproof property and thermal insulating property.

The following examples are given in illustration of the invention with comparative examples and are not intended as limitations thereof. In the examples, all parts and percents are by weight, unless otherwise stated.

Moreover, the effect of the present invention is decided on a basis of whether or not the foam passes Grade 2 incombustibility according to JIS A-1321 combustion test. The surface test according to JIS A-1321 is carried out by placing a test piece with a length, width and thickness of 22 cm×22 cm×2.5 cm in a heating furnace and then heating a surface of the test piece for a predetermined period using gas as a sub-heat source and an electric heater as a main heat source. Thereafter, the presence and degree of crack/deformation, time of lingering flame after the completion of heating, heat release value (temperature time area, °C×min.) calculated from the difference between the exhaust temperature curve of the test piece and the reference curve of perlite plate as a standard material, and fuming factor calculated from maximum fuming quantity are measured to judge the fireproof property of the test piece on a basis of acceptable standard values shown in the following Table 1. Moreover, the annexed test according to JIS A-1321 is usually carried out with respect to unhomogeneous bodies such as laminates provided with surface material and the like, which have a risk of burning that portions exposed by jointing, screwing and the like in the firing, but is always excluded in the homogeneous bodies such as the foams according to the invention and the like. Therefore, the evaluation by the annexed test is not omitted herein.

TABLE 1

Test Acceptable standard values of Grade 2 incombustibility (quasi-incombustible material) according to JIS A-1321 combustion test

| | Item | | | |
|---|---|---|---|---|
| Class | Heat release value (°C. × min.) | Fuming factor | Time of lingering flame (sec.) | Crack/ deformation |
| Surface test | not more than 100 | not more than 60 | not more than 30 | no harmful degree |

EXAMPLES 1-6, COMPARATIVE EXAMPLES 1-2

An urethane modified polyisocyanurate foam was produced as follows from a compounding recipe shown in the following Table 2, wherein crude diphenylmethane diisocyanate (trade name: Sumidur 44V-20, made by Sumitomo Bayer Urethane Co., Ltd., hereinafter abbreviated as 44V-20) was used as an organic polyisocyanate, various amine catalysts were used together with a solution of 33% potassium acetate in diethylene glycol (hereinafter abbreviated as AcOK/DEG) as an isocyanate trimerization catalyst, trichloromonofluoromethane (hereinafter abbreviated as F-11) was used as a blowing agent, an organopolysiloxane-polyoxyalkylene copolymer (trade name: L-5340, made by Nippon Unicar Co., Ltd.) was used as a silicone surfactant, and a combination of diethylene glycol (hereinafter abbreviated as DEG) with polypropylene glycol (trade name: PP-2000, hydroxyl equivalent=1,000, made by Sanyo Kasei Kogyo Co., Ltd.) was used as a polyol of a modifying agent in a total amount of 17.17 parts by weight (inclusive of diethylene glycol used as the solvent for potassium acetate) per 100 parts by weight of the organic polyisocyanate except that the weight ratio of DEG to PP-2000 was changed.

In a polyethylene beaker were weighed and mixed the ingredients other than the organic polyisocyanate, to which was added the previously weighed organic polyisocyanate. Immediately after the addition, the resulting foam forming composition was stirred at a high speed for about 6 seconds and then poured and foamed in a wooden mold. (The production of the foam was carried out at a scale of three times of the quantities shown in Table 2. The other examples as mentioned below were performed at the same scale.)

In Table 2 are shown the compounding recipe, foaming behavior and evaluation results for Grade 2 incombustibility according to JIS A-1321 combustion test with respect to the resulting urethane modified polyisocyanurate foam.

TABLE 2(a)

| | Comparative Example 1 | Example 1 | Example 2 | Example 3 | Example 4 | Example 5 | Example 6 | Comparative Example 2 |
|---|---|---|---|---|---|---|---|---|
| Compounding recipe | | | | | | | | |
| 44V - 20 | 100 | 100 | 100 | 100 | 100 | 100 | 100 | 100 |
| AcOK/DEG | 1.2 | 1.2 | 1.2 | 1.2 | 1.2 | 1.2 | 1.2 | 1.2 |
| DMP - 30 1) | 0.5 | 0.5 | 0.5 | 0.5 | — | — | 0.5 | 0.5 |
| Polycat 41 2) | — | — | — | — | 0.65 | — | — | — |
| N,N-dimethylethanolamine | — | — | — | — | — | 0.5 | — | — |
| L-5340 | 1.0 | 1.0 | 1.0 | 1.0 | 1.0 | 1.0 | 1.0 | 1.0 |
| F-11 | 20 | 20 | 20 | 20 | 20 | 20 | 20 | 20 |
| DEG | 16.37 | 13.38 | 10.30 | 8.8 | 8.8 | 8.8 | 5.6 | 2.4 |
| PP-2000 | — | 2.99 | 6.07 | 7.57 | 7.57 | 7.57 | 10.77 | 13.97 |
| Weight ratio of low molecular weight diols to high molecular weight polyether polyols | ∞ | 4.74 | 1.83 | 1.27 | 1.27 | 1.27 | 0.59 | 0.23 |
| Total amount of polyols used | 17.17 | 17.17 | 17.17 | 17.17 | 17.17 | 17.17 | 17.17 | 17.17 |
| NCO/OH | 2.2 | 2.7 | 3.4 | 3.8 | 3.8 | 3.8 | 5.5 | 9.7 |
| Foaming behavior | | | | | | | | |
| cream time (sec.) | 25 | 25 | 23 | 22 | 23 | 12 | 22 | 19 |
| rise time (sec.) | 60 | 56 | 54 | 54 | 51 | 49 | 58 | 48 |

TABLE 2(b)

| | Comparative Example 1 | Example 1 | Example 2 | Example 3 | Example 4 | Example 5 | Example 6 | Example 2 |
|---|---|---|---|---|---|---|---|---|
| Foam density (g/cm$^3$) | 0.0273 | 0.0277 | 0.0288 | 0.0293 | 0.0282 | 0.0281 | 0.0316 | 0.0348 |
| JIS-A-1321 combustion test heat release value Td$\theta$ (°C. × min.) | 213.8 | 18.8 | 0 | 0 | 8.8 | 53.8 | 37.5 | 213.8 |
| fuming factor $C_A$ | 39.0 | 26.4 | 38.4 | 25.8 | 28.2 | 28.2 | 41.4 | 34.8 |
| crack/deformation | presence/large | none/small | none/small | none/small | none/small | none/small | none/small | presence/small |
| time of lingering flame (sec.) | 14 | 0 | 8 | 10 | 3 | 26 | 25 | 31 |
| judgement | unacceptable | acceptable | acceptable | acceptable | acceptable | acceptable | acceptable | unacceptable |

Note:
1 2,4,6-tris(N,N-dimethylaminomethyl) phenol, made by Rohm & Hass Co., Ltd.
2 N,N',N''-tris(dimethylaminopropyl)-sym-hexahydrotriazine, made by Abbott Laboratories As apparent from Table 2, the foams of Examples 1 to 6 satisfying the definitions of polyols, catalyst, weight ratio of low molecular weight diols/high molecular weight polyether polyols, total amount of polyols used according to the invention pass Grade 2 incombustibility, while the foams of Comparative Examples 1 and 2 having the weight ratio outside the defined range are considerably poor in the fireproof property and become unacceptable.

EXAMPLES 7–9, COMPARATIVE EXAMPLES 3–7

Urethane modified polyisocyanurate foams were produced under the same conditions as described in Examples 1 to 6 from a compounding recipe shown in the following Table 3 except that the isocyanate trimerization catalyst was composed of an amine catalyst and a solution of 20% potassium acetate in dipropylene glycol (hereinafter abbreviated as AcOK/DPG), dipropylene glycol (hereinafter abbreviated as DPG) was used as the low molecular weight diol among the polyols used as the modifying agent, and the weight ratio of DPG/PP-2000 was changed.

In Table 3 are shown the compounding recipe, foaming behavior and evaluation results of the foam relating to Grade 2 incombustibility.

TABLE 3(a)

| | Comparative Example 3 | Example 7 | Example 8 | Example 9 | Comparative Example 4 | Comparative Example 5 | Comparative Example 6 | Comparative Example 7 |
|---|---|---|---|---|---|---|---|---|
| Compounding recipe | | | | | | | | |
| 44V - 20 | 100 | 100 | 100 | 100 | 100 | 100 | 100 | 100 |
| AcOK/DPG | 2.0 | 2.0 | 2.0 | 2.0 | 2.0 | 0.4 (potassium acetate alone) | 2.0 | 2.0 |
| DMP - 30 | 0.5 | 0.5 | 0.5 | 0.5 | 0.5 | 0.5 | — | — |
| Polycat 41 | — | — | — | — | — | — | 0.5 | — |
| N,N-dimethylethanolamine | — | — | — | — | — | — | — | 0.5 |
| L-5340 | 1.0 | 1.0 | 1.0 | 1.0 | 1.0 | 1.0 | 1.0 | 1.0 |
| F-11 | 20 | 20 | 20 | 20 | 20 | 20 | 20 | 20 |
| DPG | 15.57 | 12.58 | 9.41 | 8.0 | 1.6 | — | 9.41 | 9.41 |
| PP-2000 | — | 2.99 | 6.07 | 7.57 | 13.97 | 17.17 | 6.07 | 6.07 |
| Weight ratio of low molecular | | | | | | | | |

TABLE 3(a)-continued

|  | Comparative Example 3 | Example 7 | Example 8 | Example 9 | Comparative Example 4 | Comparative Example 5 | Comparative Example 6 | Comparative Example 7 |
|---|---|---|---|---|---|---|---|---|
| weight diols to high molecular weight polyether polyols | ∞ | 4.74 | 1.83 | 1.27 | 0.23 | 0 | 1.83 | 1.83 |
| Total amount of polyols used | 17.17 | 17.17 | 17.17 | 17.17 | 17.17 | 17.17 | 17.17 | 17.17 |
| NCO/OH | 2.8 | 3.4 | 4.2 | 4.8 | 11.7 | 41.9 | 4.2 | 4.2 |

TABLE 3(b)

|  | Comparative Example 3 | Example 7 | Example 8 | Example 9 | Comparative Example 4 | Comparative Example 5 | Comparative Example 6 | Comparative Example 7 |
|---|---|---|---|---|---|---|---|---|
| Foaming behavior |  |  |  |  |  |  |  |  |
| cream time (sec.) | 21 | 21 | 21 | 20 | 16 | 25 | 23 | 25 |
| rise time (sec.) | 55 | 70 | 65 | 71 | 58 | 120 | 67 | 63 |
| Foam density (g/cm$^3$) | 0.0272 | 0.0284 | 0.0296 | 0.0292 | 0.0347 | 0.0357 | 0.0296 | 0.0304 |
| JIS-A-1321 combustion test |  |  |  |  |  |  |  |  |
| heat release value Td$\theta$ (°C. × min.) | 218.8 | 70.0 | 70.0 | 77.5 | 260.0 | 290.0 | 180.0 | 217.5 |
| fuming factor $C_A$ | 36.6 | 30.0 | 27.0 | 27.0 | 59.4 | 75.0 | 38.1 | 42.3 |
| crack/deformation | none/medium | none/small | none/small | none/small | presence/medium | none/small | none/small | small/small |
| time of lingering flame (sec.) | 0 | 14 | 10 | 15 | 86 | 16 | 0 | 0 |
| judgement | unacceptable | acceptable | acceptable | acceptable | unacceptable | unacceptable | unacceptable | unacceptable |

From the results of Table 3, it can be seen that even when using the combination of DPG and PP-2000 as the polyol, if the weight ratio of DPG/PP-2000 is outside the defined range according to the invention, the resulting foams become unacceptable for Grade 2 incombustibility due to the significant increase of the heat release value (Td$\theta$), and that when using the catalyst other than DMP-30 among the dialkylaminoalkyl phenols, the resulting foams become unacceptable due to the fact that the heat release value (Td$\theta$) exceeds the standard value.

EXAMPLE 10, COMPARATIVE EXAMPLES 8-9

An urethane modified polyisocyanurate foam was produced under the same conditions as described in Example 7 except that the weight ratio of DPG/PP-2000 was 4.74 and the total amount of the polyols used was changed.

In the following Table 4 are shown the compounding recipe, foaming behavior and evaluation results of the foam relating to Grade 2 incombustibility.

TABLE 4

|  | Comparative Example 8 | Example 10 | Comparative Example 9 |
|---|---|---|---|
| Compounding recipe |  |  |  |
| 44V - 20 | 100 | 100 | 100 |
| AcOK/DPG | 2.0 | 2.0 | 2.0 |
| DMP - 30 | 0.5 | 0.5 | 0.5 |
| L-5340 | 1.0 | 1.0 | 1.0 |
| F-11 | 20 | 20 | 20 |
| DPG | 5.49 | 9.81 | 22.51 |
| PP-2000 | 1.50 | 2.41 | 5.08 |
| Weight ratio of low molecular weight diols to high molecular weight polyether polyols | 4.74 | 4.74 | 4.74 |
| Total amount of polyols used | 8.59 | 13.81 | 29.19 |
| NCO/OH | 6.8 | 4.25 | 2.0 |
| Foaming behavior |  |  |  |
| cream time (sec.) | 24 | 22 | 23 |
| rise time (sec.) | 73 | 73 | 63 |
| Foam density (g/cm$^3$) | 0.0290 | 0.0283 | 0.0297 |
| JIS-A-1321 combustion test heat release value Td$\theta$ (°C. × min.) | 180.0 | 77.5 | 243.8 |
| fuming factor $C_A$ | 31.5 | 45.0 | 51.6 |
| crack/deformation | presence/small | none/small | presence/medium |
| time of lingering flame (sec.) | 10 | 0 | 0 |
| judgement | unacceptable | acceptable | unacceptable |

From the results of Table 4, it can be seen that when the total amount of polyols used is outside the defined range according to the invention as described in Comparative Examples 8 and 9, the heat release value (Td$\theta$) of the foams exceeds the standard value, while the foam of Example 10 has a fireproof property passed Grade 2 incombustibility with small deformation.

COMPARATIVE EXAMPLES 10-11

An urethane modified polyisocyanurate foam was produced under the same conditions as described in Example 3 except that potassium acetate and Polycat 41 were used alone as the isocyanate trimerization catalyst.

In the following Table 5 are shown the compounding recipe, foaming behavior and evaluation results of the foam relating to Grade 2 incombustibility.

TABLE 5

|  | Comparative Example 10 | Comparative Example 11 |
|---|---|---|
| Compounding recipe |  |  |
| 44V - 20 | 100 | 100 |
| AcOK/DEG | 1.2 | — |
| Polycat 41 | — | 3.0 |
| L-5340 | 1.0 | 1.0 |
| F-11 | 20 | 20 |
| DEG | 8.8 | 9.6 |
| PP-2000 | 7.57 | 7.57 |

TABLE 5-continued

|  | Comparative Example 10 | Comparative Example 11 |
|---|---|---|
| Weight ratio of low molecular weight diols to high molecular weight polyether polyols | 1.27 | 1.27 |
| Total amount of polyols used | 17.17 | 17.17 |
| NCO/OH | 3.8 | 3.8 |
| Foaming behavior |  |  |
| cream time (sec.) | 74 | 20 |
| rise time (sec.) | 111 | 104 |
| Foam density (g/cm$^3$) | 0.0291 | 0.0312 |
| JIS-A-1321 combustion test |  |  |
| heat release value Td$\theta$ (°C. × min.) | 158.8 | 220.8 |
| fuming factor C$_A$ | 35.4 | 58.2 |
| crack/deformation | none/small | none/small |
| time of lingering flame (sec.) | 6 | 34 |
| judgement | unacceptable | unacceptable |

As apparent from Table 5, when potassium acetate as an alkali metal salt of a carboxylic acid or Polycat 41 as an amine catalyst is used alone, the resulting foam cannot pass Grade 2 incombustibility due to the degradation of the fireproof property.

EXAMPLES 11-12, COMPARATIVE EXAMPLES 12-14

Urethane modified polyisocyanurate foams were produced under the same conditions as described in Example 8 except that dipropylene glycol was used as the low molecular weight diol, various polypropylene glycols were used as the high molecular weight polyether polyols, the weight ratio of dipropylene glycol to polypropylene glycol was 1.83 and the total amount of these polyols used was 17.17 parts by weight per 100 parts by weight of the organic polyisocyanate.

In the following Table 6 are shown the compounding recipe, foaming behavior and evaluation results of the foam relating to Grade 2 incombustibility.

From the results of Table 6, it can be seen that when using polypropylene glycols with a hydroxyl equivalent of less than 200, the resulting foams become unacceptable for Grade 2 incombustibility because the heat release value (Td$\theta$) exceeds the standard value.

TABLE 6(a)

|  | Example 11 | Example 12 | Comparative Example 12 | Comparative Example 13 | Comparative Example 14 |
|---|---|---|---|---|---|
| Compounding recipe |  |  |  |  |  |
| 44V - 20 | 100 | 100 | 100 | 100 | 100 |
| AcOK/DPG | 2.0 | 2.0 | 2.0 | 2.0 | 2.0 |
| DMP - 30 | 0.5 | 0.5 | 0.5 | 0.5 | 0.5 |
| L-5340 | 1.0 | 1.0 | 1.0 | 1.0 | 1.0 |
| F-11 | 20 | 20 | 20 | 20 | 20 |
| DPG | 9.41 | 9.41 | 9.41 | 9.41 | 9.41 |
| PP-4000 (3) | 6.07 | — | — | — | — |
| PP-1200 (4) | — | 6.07 | — | — | — |
| PP-750 (5) | — | — | 6.07 | — | — |
| PP-400 (6) | — | — | — | 6.07 | — |
| PP-200 (7) | — | — | — | — | 6.07 |
| Weight ratio of low molecular weight diols to high molecular weight polyether polyols | 1.83 | 1.83 | 1.83 | 1.83 | 1.83 |
| Total amount of polyols used | 17.17 | 17.17 | 17.17 | 17.17 | 17.17 |
| NCO/OH | 4.3 | 4.1 | 4.0 | 3.7 | 3.2 |

TABLE 6(b)

|  | Example 11 | Example 12 | Comparative Example 12 | Comparative Example 13 | Comparative Example 14 |
|---|---|---|---|---|---|
| Foaming behavior |  |  |  |  |  |
| cream time (sec.) | 27 | 25 | 23 | 23 | 24 |
| rise time (sec.) | 75 | 68 | 62 | 62 | 70 |
| Foam density (g/cm$^3$) | 0.0322 | 0.0300 | 0.0302 | 0.0287 | 0.0288 |
| JIS-A-1321 combustion test |  |  |  |  |  |
| heat release value Td$\theta$ (°C. × min.) | 51.3 | 76.3 | 161.3 | 145.0 | 145.0 |
| fuming factor C$_A$ | 42.0 | 33.9 | 39.6 | 45.0 | 42.0 |
| crack/deformation | none/small | none/small | none/small | none/small | none/small |
| time of lingering flame (sec.) | 13 | 15 | 23 | 15 | 15 |
| judgement | acceptable | acceptable | unacceptable | unacceptable | unacceptable |

Note:
3 Polypropylene glycol, hydroxyl equivalent 2000, made by Sanyo Kasei Kogyo Co., Ltd.
4 Polypropylene glycol, hydroxyl equivalent 600, made by Sanyo Kasei Kogyo Co., Ltd.
5 Polypropylene glycol, hydroxyl equivalent 375, made by Sanyo Kasei Kogyo Co., Ltd.
Polypropylene glycol, hydroxyl equivalent 200, made by Sanyo Kasei Kogyo Co., Ltd.
Polypropylene glycol, hydroxyl equivalent 100, made by Sanyo Kasei Kogyo Co., Ltd.

EXAMPLES 13-17, COMPARATIVE EXAMPLE 15

Urethane modified polyisocyanurate foams were produced under the same conditions as described in Example 1 except that diethylene glycol was used as the low molecular weight diol and various polyether polyols were used as the high molecular weight polyether polyol.

In the following Table 7 are shown the compounding recipe, foaming behavior and evaluation results of the foam relating to Grade 2 incombustibility.

TABLE 7(a)

|  | Example 13 | Example 14 | Comparative Example 15 | Example 15 | Example 16 | Example 17 |
|---|---|---|---|---|---|---|
| Compounding recipe |  |  |  |  |  |  |
| 44V - 20 | 100 | 100 | 100 | 100 | 100 | 100 |
| DEG | 8.8 | 8.8 | 2.4 | 8.8 | 8.8 | 8.8 |
| PE - 61 (8) | 7.57 | — | — | — | — | — |
| GP-3000 (9) | — | 7.57 | 13.97 | — | — | — |
| FA-103 (10) | — | — | — | 7.57 | — | — |
| FA-702 (11) | — | — | — | — | 7.57 | — |
| PTG-500 (12) | — | — | — | — | — | 7.57 |
| Weight ratio of low molecular weight diols to high molecular weight polyether polyols | 1.27 | 1.27 | 0.23 | 1.27 | 1.27 | 1.27 |
| Total amount of polyois used | 17.17 | 17.17 | 17.17 | 17.17 | 17.17 | 17.17 |
| NCO/OH | 3.8 | 3.8 | 9.7 | 3.9 | 3.9 | 3.8 |
| Foaming behavior |  |  |  |  |  |  |
| cream time (sec.) | 20 | 26 | 25 | 8 | 22 | 33 |
| rise time (sec.) | 50 | 65 | 63 | 34 | 55 | 75 |
| Foam density (g/cm³) | 0.0278 | 0.0289 | 0.0295 | 0.0306 | 0.0291 | 0.0279 |

TABLE 7(b)

|  | Example 13 | Example 14 | Comparative Example 15 | Example 15 | Example 16 | Example 17 |
|---|---|---|---|---|---|---|
| JIS-A-1321 combustion test |  |  |  |  |  |  |
| heat release value Td$\theta$ (°C. × min.) | 12.5 | 60.0 | 267.5 | 25.0 | 82.5 | 43.8 |
| fuming factor $C_A$ | 30 | 32.4 | 35.1 | 36.0 | 33.0 | 32.1 |
| crack/deformation | none/small | none/small | presence/medium | none/small | none/small | none/small |
| time of lingering flame (sec.) | 10 | 0 | 0 | 13 | 0 | 0 |
| judgement | acceptable | acceptable | unacceptable | acceptable | acceptaable | acceptable |

Note:
Common compounding conditions AcOK/DEG = 1.2 parts, DMP-30 = 0.5 part, L-5340 = 1.0 part, F-11 = parts
8 polyoxyethylene polyoxypropylene glycol, hydroxyl equivalent 900, made by Sanyo Kasei Kogyo Co., Ltd.
9 polyoxypropylene triol, hydroxyl equivalent 1000, made by Mitsui Nisso Co., Ltd.
10 polyoxyethylene polyoxypropylene triol, all of terminal hydroxyl groups are primary hydroxyl group, hydroxyl equivalent 1120, made by Sanyo Kasei Kogyo Co., Ltd.
11 pentaerythritol-based polyoxyethylene polyoxypropylene tetraol, hydroxyl equivalent 1510, made by Sanyo Kasei Kogyo Co., Ltd.
12 polytetramethylene glycol, hydroxyl equivalent 1000, made by Nippon Polyurethane Co., Ltd.

As apparent from Table 7, all of the foams in Examples 13 to 17 have a fireproof property passed Grade 2 incombustibility, while the foam of Comparative Example 15 exhibits a considerable decrease of the fireproof property.

EXAMPLES 18-23, COMPARATIVE EXAMPLES 16-29

Urethane modified polyisocyanurate foams were produced under the same conditions as described in Example 1 except that PP-2000 was used as the high molecular weight polyether polyol, and various diol, triol and tetraol were used as the low molecular weight diol, and potassium acetate used as the catalyst was dissolved in the total amount of the diols used.

In the following Tables 8 to 10 are shown the compounding recipe, foaming behavior and evaluation results of the foam relating to Grade 2 incombustibility.

TABLE 8(a)

|  | Comparative Example 16 | Example 18 | Example 19 | Example 20 | Comparative Example 17 | Comparative Example 18 | Comparative Example 19 | Example 21 |
|---|---|---|---|---|---|---|---|---|
| Compounding recipe |  |  |  |  |  |  |  |  |
| 44V - 20 | 100 | 100 | 100 | 100 | 100 | 100 | 100 | 100 |
| potassium acetate | 0.4 | 0.4 | 0.4 | 0.4 | 0.4 | 0.4 | 0.4 | 0.4 |
| F-11 | 15 | 20 | 20 | 20 | 20 | 16 | 20 | 20 |
| ethylene glycol | 5.39 | — | — | — | — | — | — | — |
| DEG | — | 9.22 | — | — | — | — | — | — |
| triethylene glycol | — | — | 13.05 | — | — | — | — | — |
| tetraethylene glycol | — | — | — | 16.88 | — | — | — | — |
| PEG 200 (13) | — | — | — | — | 17.40 | — | — | — |
| 1,3-propane diol | — | — | — | — | — | 6.61 | — | — |
| propylene glycol | — | — | — | — | — | — | 6.47 | — |
| dipropylene glycol | — | — | — | — | — | — | — | 7.57 |
| PP-2000 | 6.96 | 6.96 | 6.96 | 6.96 | 6.96 | 6.96 | 10.70 | 6.96 |
| Weight ratio of low molecular weight diols to high molecular weight polyether Polyols | 0.77 | 1.32 | 1.88 | 2.43 | 2.50 | 0.95 | 0.60 | 1.09 |
| Total amount of polyols used | 12.35 | 16.18 | 20.01 | 23.84 | 24.36 | 13.57 | 17.17 | 14.53 |

TABLE 8(b)

|  | Comparative Example 16 | Example 18 | Example 19 | Example 20 | Comparative Example 17 | Comparative Example 18 | Comparative Example 19 | Example 21 |
|---|---|---|---|---|---|---|---|---|
| NCO/OH | 4.0 | 4.0 | 4.0 | 4.0 | 4.0 | 4.0 | 4.0 | 4.8 |
| Foaming behavior |  |  |  |  |  |  |  |  |
| cream time (sec.) | 34 | 30 | 15 | 14 | 12 | 23 | 37 | 15 |
| rise time (sec.) | 60 | 70 | 52 | 56 | 41 | 56 | 85 | 76 |
| Foam density (g/cm$^3$) | 0.0251 | 0.0293 | 0.0289 | 0.0267 | 0.0271 | 0.0308 | 0.0262 | 0.0292 |
| JIS-A-1321 combustion test |  |  |  |  |  |  |  |  |
| heat release value Td$\theta$ (°C. × min.) | 146.3 | 33.8 | 16.3 | 88.8 | 215.0 | 137.5 | 236.25 | 77.5 |
| fuming factor C$_A$ | 39.0 | 34.5 | 39.0 | 27.6 | 36.0 | 45.0 | 37.8 | 27.0 |
| crack/deformation | none/medium | none/small | none/small | none/small | presence/small | none/small | presence/medium | none/small |
| time of lingering flame (sec.) | 12 | 0 | 7 | 17 | 7 | 0 | 0 | 20 |
| judgement | unacceptable | acceptable | acceptable | acceptable | unacceptable | unacceptable | unacceptable | acceptable |

Note:
Common compounding conditions DMP-30 = 0.5 part, L-5340 = 1.0 part
(13) polyethylene glycol, hydroxyl equivalent 100, made by Sanyo Kasei Kogyo Co., Ltd.

TABLE 9(a)

|  | Comparative Example 20 | Comparative Example 21 | Example 21 | Example 22 | Comparative Example 22 | Comparative Example 23 | Comparative Example 24 | Comparative Example 25 |
|---|---|---|---|---|---|---|---|---|
| Compounding recipe |  |  |  |  |  |  |  |  |
| 44V - 20 | 100 | 100 | 100 | 100 | 100 | 100 | 100 | 100 |
| potassium acetate | 0.8 | 0.8 | 0.8 | 0.8 | 0.4 | 0.4 | 0.4 | 0.4 |
| F-11 | 20 | 20 | 20 | 20 | 20 | 20 | 20 | 20 |
| 1,4-butane diol | 7.83 | — | — | — | — | — | — | — |
| 1,3-butane diol | — | 7.83 | — | — | — | — | — | — |
| 2,3-butane diol | — | — | 7.83 | — | — | — | — | — |
| 2-butene-1,4-diol | — | — | — | 7.83 | — | — | — | — |
| 1,5-pentane diol | — | — | — | — | 9.05 | — | — | — |
| PP-200 | — | — | — | — | — | 17.40 | — | — |
| glycerin | — | — | — | — | — | — | 9.60 | — |
| trimethylol propane | — | — | — | — | — | — | — | 7.78 |
| PP-2000 | 6.96 | 6.96 | 6.96 | 6.96 | 6.96 | 6.96 | 7.57 | 6.96 |
| Weight ratio of low molecular weight diols to high molecular weight polyether polyols | 1.13 | 1.13 | 1.13 | 1.13 | 1.30 | 2.50 | 1.27 | 1.12 |
| Total amount of polyols used | 14.79 | 14.79 | 14.79 | 14.79 | 16.01 | 24.36 | 17.17 | 14.74 |

TABLE 9(b)

|  | Comparative Example 20 | Comparative Example 21 | Example 21 | Example 22 | Comparative Example 22 | Comparative Example 23 | Comparative Example 24 | Comparative Example 25 |
|---|---|---|---|---|---|---|---|---|
| NCO/OH | 4.0 | 4.0 | 4.0 | 4.0 | 4.0 | 4.0 | 3.4 | 4.0 |
| Foaming behavior |  |  |  |  |  |  |  |  |
| cream time (sec.) | 16 | 17 | 40 | 16 | not foamed | 50 | not foamed | 35 |
| rise time (sec.) | 36 | 36 | 85 | 34 |  | 120 |  | 90 |
| Foam density (g/cm$^3$) | 0.0324 | 0.0304 | 0.0280 | 0.0274 |  | 0.0297 |  | 0.0316 |
| JIS-A-1321 combustion test |  |  |  |  |  |  |  |  |
| heat release value Td$\theta$ (°C. × min.) | 333.8 | 196.3 | 83.8 | 73.8 |  | 166.3 |  | 260.0 |
| fuming factor C$_A$ | 32.4 | 39.0 | 51.0 | 39.0 | not measured | 39.0 | not measured | 59.4 |
| crack/deformation | none/small | presence/small | none/small | none/small |  | none/small |  | none/medium |
| time of lingering flame (sec.) | 0 | 0 | 0 | 0 |  | 0 |  | 42 |
| judgement | unacceptable | unacceptable | acceptable | acceptable |  | unacceptable |  | unacceptable |

TABLE 10(a)

|  | Comparative Example 26 | Comparative Example 27 | Comparative Example 28 | Comparative Example 29 |
|---|---|---|---|---|
| Compounding recipe |  |  |  |  |
| 44V - 20 | 100 | 100 | 100 | 100 |

TABLE 10(a)-continued

| | Comparative Example 26 | Comparative Example 27 | Comparative Example 28 | Comparative Example 29 |
|---|---|---|---|---|
| potassium acetate | 0.4 | 0.4 | 0.4 | 0.4 |
| F-11 | 20 | 20 | 20 | 20 |
| GP-250 (14) | 14.44 | — | — | — |
| AM-30 (15) | — | 9.6 | — | — |
| Hyprox RQ-350 (16) | — | — | 16.01 | — |
| Newpoi NP-300 (17) | — | — | — | 9.6 |
| PP-2000 | 6.96 | 7.57 | 6.96 | 6.96 |
| Weight ratio of low molecular weight diols to high molecular weight polyether polyols | 2.07 | 1.27 | 2.30 | 1.38 |
| Total amount of polyols used | 21.40 | 17.17 | 22.97 | 16.56 |
| NCO/OH | 4.0 | 7.4 | 4.0 | 5.2 |
| Foaming behavior | | | | |
| cream time (sec.) | 46 | 24 | 46 | 35 |
| rise time (sec.) | 105 | 135 | 115 | 90 |

TABLE 10(b)

| | Comparative Example 26 | Comparative Example 27 | Comparative Example 28 | Comparative Example 29 |
|---|---|---|---|---|
| Foam density (g/cm$^3$) | 0.0305 | 0.0318 | 0.0336 | 0.0319 |
| JIS-A-1321 combustion test | | | | |
| heat release value Td$\theta$ (°C. × min.) | 266.3 | 260.0 | 266.3 | 232.5 |
| fuming factor $C_A$ | 48.6 | 49.5 | 67.2 | 72.0 |
| crack/deformation | none/medium | presence/small | none/medium | presence/medium |
| time of lingering flame (sec.) | 0 | 0 | 29 | 33 |
| judgement | unacceptable | unacceptable | unacceptable | unacceptable |

14 polyoxypropylene triol, hydroxyl equivalent 83, made by Sanyo Kasei Kogyo Co., Ltd.
15 polyoxyethylene triol, hydroxyl equivalent 106, made by Asahi Denka Kogyo Co., Ltd.
16 pentaerythritol-based polyoxypropylene tetraol, hydroxyl equivalent 92, made by Dainippon Ink Kagaku Kogyo Co., Ltd.
17 ethylenediamine-based polyoxypropylene tetraol, hydroxyl equivalent 74, made by Sanyo Kasei Kogyo Co., Ltd.

From the results of Table 8, it can be seen that when diethylene glycol, triethylene glycol, tetraethylene glycol, dipropylene glycol, 2,3-butane diol and 2-butene-1,4-diol are used as the low molecular weight diol, all of the resulting foams have a fireproof property passed Grade 2 incombustibility, while when using diols other than the above mentioned diols, triol and tetraol, the fireproof property considerably lowers and the resulting foam becomes unacceptable for Grade 2 incombustibility.

EXAMPLES 24-26

Urethane modified polyisocyanurate foams were produced in the same manner as described in Example 1, except that a mixture of two polyols was used as the high molecular weight polyether polyol in Example 24, a mixture of two diols was used as the low molecular weight diol in Example 25, and potassium n-caprylate was used as the alkali metal salt of the carboxylic acid in Example 26.

In the following Table 11 are shown the compounding recipe, foaming behavior and evaluation results of the foam relating to Grade 2 incombustibility.

TABLE 11

| | Example 24 | Example 25 | Example 26 |
|---|---|---|---|
| Compounding recipe | | | |
| 44V - 20 | 100 | 100 | 100 |
| AcOK/DEG | 1.2 | 1.2 | — |
| potassium n-caprylate/DEG 18 | — | — | 1.2 |
| DMP-30 | 0.5 | 0.5 | 0.5 |
| L-5340 | 1.0 | 1.0 | 1.0 |
| F-11 | 20 | 20 | 20 |
| DEG | 8.8 | 4.0 | 8.8 |
| DPG | — | 4.8 | — |
| PP-2000 | 3.79 | 7.57 | 7.57 |
| GP-3000 | 3.78 | — | — |
| Weight ratio of low molecular weight diols to high molecular weight polyether polyols | 1.27 | 1.27 | 1.27 |
| Total amount of polyols used | 17.17 | 17.17 | 17.17 |
| NCO/OH | 3.8 | 4.2 | 3.8 |
| Foaming behavior | | | |
| cream time (sec.) | 25 | 20 | 25 |
| rise time (sec.) | 58 | 61 | 75 |
| Foam density (g/cm$^3$) | 0.0300 | 0.0303 | 0.0286 |
| JIS-A-1321 combustion test | | | |
| heat release value Td$\theta$ (°C. × min.) | 22.5 | 51.3 | 20.0 |
| fuming factor $C_A$ | 43.8 | 34.2 | 29.4 |
| crack/deformation | none/small | none/small | none/small |
| time of lingering flame (sec.) | 15 | 0 | 0 |
| judgement | acceptable | acceptable | acceptable |

Note:
18 Solution of 33% potassium n-caprylate in diethylene glycol (the amount of diethylene glycol used as the solvent is also incorporated in the amount of the low molecular weight diols used).

In any case, the resulting foams have a fireproof property passed Grade 2 incombustibility as apparent from Table 9.

What is claimed is:

1. A method of producing flameproof polyisocyanurate foams by reacting an organic polyisocyanate with a polyol in the presence of an isocyanate trimerization catalyst, a blowing agent and other additives to form an urethane modified polyisocyanurate foam, which comprises:

(1) using, as said polyol, at least one low molecular weight diol selected from the group consisting of
    (a) compounds having the general formula

HO—(CH$_2$CH$_2$O)$_{\overline{n}}$H, wherein n is 2, 3 or 4, (b) compounds having the general formula

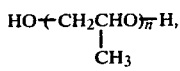

wherein n is 2 or 3, (c) 2,3,-butane diol and (d) 2-butene-1,4-diol together with at least one high molecular weight polyether polyol having 2 to 4 hydroxyl groups in its molecule and a hydroxyl equivalent of 600 to 2,000, (2) being a weight ratio of the sum of low molecular weight diols to the sum of high molecular weight polyetherpolyols within a range of 0.55 to 7.0, (3) being a total amount of the low molecular weight diols and high molecular weight polyetherpolyols used as said polyol within a range of 12.5 to 25 parts by weight per 100 parts by weight of said organic polyisocyanate, and (4) using, as said isocyanate trimerization catalyst, a combination of an alkali metal salt of a carboxylic acid having a carbon number of 2 to 12 with a tertiary amino compound in case of using said low molecular-weight (a)-type diol, or a combination of an alkali metal salt of a carboxylic acid having a carbon number of 2 to 12 with a dialkylaminoalkyl phenol in case of using said low molecular weight (b), (c) or (d)-type diol alone.

2. The method as claimed in claim 1, wherein said organic polyisocyanate is an aromatic polyisocyanate.

3. The method as claimed in claim 1, wherein said organic polyisocyanate is a polynuclear polyisocyanate having the following formula

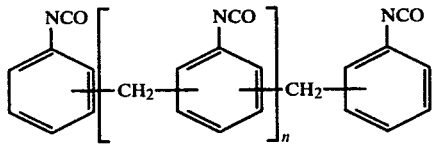

wherein n is 0 or an integer of more than 1, or a mixture thereof.

4. The method as claimed in claim 1, wherein said high molecular weight polyetherpolyol is selected from polyoxyalkylene glycols obtained by reacting ethylene oxide, propylene oxide, butylene oxide or a mixture thereof with a diol such as ethylene glycol, 1,2-propylene glycol, 1,3-propane diol, 1,4-butane diol, 2,3-butane diol, 1,5-pentane diol, 1,2-hexane diol, diethylene glycol and dipropylene glycol; polyoxyalkylene triols or polyoxyalkylene tetraols obtained by reacting ethylene oxide, propylene oxide, butylene oxide or a mixture thereof with a triol or tetraol such as glycerin, trimethylol propane, 1,2,6-hexane triol and pentaerythritol; and polytetramethylene glycol.

5. The method as claimed in claim 1, wherein said weight ratio of the sum of low molecular weight diols to the sum of high molecular weight polyetherpolyols is 1.0 to 5.0.

6. The method as claimed in claim 1, wherein said total amount of low molecular weight diols and high molecular weight polyetherpolyols used is 14 to 22 parts by weight per 100 parts by weight of said organic polyisocyanate.

7. The method as claimed in claim 1, wherein said alkali metal salt of carboxylic acid having a carbon number of 2 to 12 is selected from the group consisting of potassium acetate, potassium propionate, potassium 2-ethylhexanoate, potassium caprylate and mixtures thereof.

8. The method as claimed in claim 1, wherein said tertiary amino compound is selected from dialkylaminoalkyl phenols; triethylamine; triazine cyclic derivatives; tetraalkylalkylene diamines; triethylenediamine and its lower alkyl substituted derivatives; and mixtures thereof.

9. The method as claimed in claim 1, wherein said dialkylaminoalkyl phenol is selected from 2,4,6-tris(-dimethylaminoethyl)phenol, 2,4- and 2,6-bis(dimethylaminomethyl)phenols and mixtures thereof.

10. The method as claimed in claim 1, wherein said blowing agent is a fluorinated and/or chlorinated low-boiling inert solvent.

11. The method as claimed in claim 1, wherein said blowing agent is trichloromonofluoromethane.

12. The method of claim 8 wherein said triazine cyclic derivative is N,N',N"-tris(dimethylaminopropyl)-sym-hexahydrotriazine.

* * * * *